United States Patent Office 3,101,381
Patented Aug. 20, 1963

3,101,381
PROCESS FOR THE SEPARATION OF HYDROCARBONS
Warren Nesmith Baxter, Orange, Tex., assignor to E. I. du Pont de Nemours and Company, Wilmington, Del., a corporation of Delaware
No Drawing. Filed June 5, 1961, Ser. No. 114,635
8 Claims. (Cl. 260—677)

The present invention relates to a process of separating olefinic hydrocarbons from hydrocarbon mixtures, and, more particularly, to a process of separating olefinic hydrocarbons from hydrocarbon mixtures employing absorption and desorption techniques.

It has recently been discovered that aqueous solutions of silver fluoborate and/or silver fluosilicate are capable of selectively absorbing olefins from fluid mixtures, i.e., gaseous or liquid mixtures thereof, with saturated hydrocarbons and that the absorbed olefin can be subsequently recovered by heating the aqueous silver fluoborate or silver fluosilcate solution. Alternate methods of recovery, which may be combined with each other or with the heating step, comprise dilution and reduction of pressure. On desorption the silver salt solution is recycled to the absorption zone. This process therefore provides a simple method for the separation of olefins from hydrocarbon streams. The process can be carried out on a batch scale or on a continuous scale using countercurrent streams of the hydrocarbon and the absorbing salt solution.

It was further discovered that a synergistic improvement in olefin absorption can be achieved if a secondary metal fluoborate or fluosilcate is added. The metal in the secondary metal salt is one that has a charge to ionic radius ratio of greater than one. The ratio of charge or valence to ionic radius is readily calculated from published data. Thus, both can be found in Therald Moeller's advanced textbook "Inorganic Chemistry," published by John Wiley and Sons, Inc. (1952), on pages 140 to 142. In particular, the metals of group II of the periodic table of elements having atomic numbers from 4 to 56 inclusive and copper, lead and lithium are highly suitable. The concentration of the silver salt generally varies from 4 to 12 molar and that of the secondary metal salt is generally equal to or less than the concentration of the silver salt. In order to maintain such concentrations in solutions, it is generally preferred to maintain the pH of the solutions below 2 which is accomplished by the addition of fluoboric acid or hydrogen fluoride.

One of the difficulties observed in this process of separating olefins from saturated hydrocarbons is the presence of acetylenic hydrocarbons, and particularly acetylene and methyl acetylene, in many hydrocarbon streams from which it is desirable to separate the olefins. The presence of active hydrogen containing acetylenes, i.e., $RC{\equiv}CH$, in a hydrocarbon stream which is subjected to the described separation process results in the formation of a silver acetylide compound which is soluble in the aqueous phase to a limited extent. The compound is sufficiently stable so that it is not decomposed during the desorption step to release the absorbed acetylene and is carried with the recycle back to the absorber. As the concentration of silver acetylide builds up it will result in the formation of a precipitate. Thus, the formation of silver acetylide is undesirable in that silver, which is essential in the absorption process, is withdrawn from the system and in that a solid is formed in the otherwise gas-liquid or liquid-liquid system, which can cause substantial difficulties and hazards in the operation of a continuous process.

It is, therefore, the principal object of the present invention to provide a method for removing silver acetylides formed in absorption-desorption separation systems which are based on silver fluoborate and/or silver fluosilicate. Other objects will become apparent hereinafter.

The objects of the present invention are accomplished in the separation of olefinic hydrocarbons from fluid mixtures thereof with saturated hydrocarbons which also contain quantities of acetylenic hydrocarbons, i.e., hydrocarbons having the general formula $RC{\equiv}CH$, where R is a hydrogen or a hydrocarbon radical, comprising passing said fluid hydrocarbon mixture through an aqeuous solution of silver fluoborate and/or silver fluosilicate and thereafter regenerating the silver salt solution and recovering the absorbed olefinic hydrocarbon, by the step of reacting at least part of the regenerated solution at a temperature above 100° C. with nitric acid in the presence of a non-oxidizing mineral acid selected from the class consisting of hydrogen fluoride and fluoboric acid prior to reusing the silver salt solution. The term "olefinic hydrocarbon" as employed herein is used to define any hydrocarbon containing ethylenic unsaturation. The present invention is based on the discovery that silver acetylide when dissolved in an aqueous solution such as is employed in the described separation process to which either hydrogen fluoride or fluoboric acid has been added can be quantitatively decomposed into silver ions and volatile decomposition products and/or soluble decomposition products at temperatures above 100° C. and preferably above 150° C. Decomposition of the acetylide in the absence of nitric acid results in the formation of silver metal and insoluble organic products. The quantity of nitric acid employed depends on the quantity of silver acetylide present in the regenerated solution. Thus, in general it is preferred to employ an excess over the stoichiometric quantity necessary to oxidize the silver acetylide to silver ions and carbon dioxide and other soluble and/or volatile decomposition products. In general, therefore, 3 to 10 moles of nitric acid are employed for each mole of silver acetylide. A larger excess of nitric acid is preferably avoided since the solubility of silver nitrate is substantially less than that of silver fluoborate or fluosilicate and can cause the precipitation of silver nitrate. The preferred limits are therefore readily calculated. It is preferred to employ the nitric acid as concentrated nitric acid in order to minimize the dilution of the absorption solution.

The silver acetylide removal system of the present invention is only effective if the absorbing solution contains either hydrogen fluoride or fluoboric acid. The concentration of the acid should be at least one molar; preferably the range is from 1 to 10 molar; although there is no upper limit on the concentration, no improvement in silver acetylide decomposition is obtained by such increases. Too high concentrations should be avoided because of corrosion and salting out of the absorbing solutions.

It is of course also feasible to react solid silver acetylide with nitric acid to result in volatile decomposition products and silver ions. However, it is preferred not to let the concentration of silver acetylide rise to such a level that a precipitate occurs. This is not very difficult since the solubility of silver acetylide in the aqueous solution employed in the olefin separation process is in the range of 1% to 10%. Normally the concentration of acetylene is small in hydrocarbon streams comprising mixtures of olefinic compounds and saturated hydrocarbons. Hence, the amount of silver acetylide formed in a single pass through the separation system is small and only continuous circulation will result in a substantial increase in the concentration of silver acetylide. Consequently, it is only necessary to submit a part of the regenerated solution to the purification step of the present invention in order to maintain the silver acetylide concentration at any desired low and constant concentration. In the event that the concentration of acetylene is high enough to cause precipitation prior to saturation of the fluoborate solution in a batch process the absorption can, of course, be stopped prior to the saturation point. If in a continuous process the acetylene concentration should be high enough to result in precipitation in a single pass which is extremely unlikely, this can be remedied by adjusting the flow rates of the hydrocarbon stream and the absorption solution stream.

The invention is further illustrated by the following examples.

*Example I*

A hydrocarbon stream having the following composition:

| | Mole percent |
|---|---|
| Ethylene | 38 |
| Propylene | 11 |
| Butene-1 | 5 |
| Ethane | 10 |
| Methane | 25 |
| Propane | 10 |
| Acetylene | 0.1 |
| Higher boilers | 0.1 | was passed at the rate of 1 l./min. (measured at atmospheric pressure) through 100 ml. of a 6 M silver fluoborate, 0.9 M magnesium fluoborate, 2 M fluoborate, acid solution contained in a unit designed for continuous circulation of the solution and continuous absorption-desorption of the olefins in sections of the unit designated as the "absorber" and "desorber." The olefins were absorbed at 45° C. and 300 p.s.i. The off-gases from the "absorber" were substantially free of unsaturated hydrocarbons. The olefin rich solution was circulated to the "desorber" where olefins were desorbed at 70° C. and atmospheric pressure. The desorbed gases had a composition of greater than 98% olefins and contained no acetylene. After 2 hrs. of operation the solution contained 0.012 g. of silver acetylide per ml. This solution was passed into a pressure vessel and heated to 130° C. at atmospheric pressure to desorb all but the last traces of olefins, then heated to 175° C. under a nitrogen pressure of 300 p.s.i. and 1.5 ml. of an aqueous 70% nitric acid solution was injected. The mixture was agitated for a period of 15 min. The reaction mixture was cooled and vented off. Analysis of the resulting solution indicated no silver precipitate and no insoluble organic material. In the absence of nitric acid a solid non-volatile organic precipitate and a silver precipitate is formed. Analysis of the solution also indicated that it contained less than 2×10⁻⁴ g. of silver acetylide per ml. of solution.

*Example II*

Into a 6 M silver fluoborate, 0.9 M magnesium fluoborate, 2 M fluoboric acid solution was passed sufficient acetylene to cause the convesion of 3 ml. of acetylene to silver acetylide. The resulting solution was heated to 175° C. in a closed vessel for a period of 15 min. under 300 p.s.i. of nitrogen. The resulting solution was slightly colored and contained a precipitate which was composed of organic material and silver metal. Analysis of the reaction mixture showed that less than 2% of the original acetylide remained.

*Example III*

Example II was repeated except that 0.02 ml. of 70% nitric acid was added to the fluoborate solution prior to heating. The resulting solution was clear and contained no precipitate. The resulting solution on analysis was found to contain less than 1% of the original acetylide. Substantially the same result is obtained when hydrogen fluoride is substituted for the fluoboric acid.

*Example IV*

Example III was repeated except a 10 M solution of silver fluoborate was employed and the megnesium fluoborate and fluoboric acid were omitted. Analysis of the resulting solution showed that less than 10% of the acetylide had been decomposed.

*Example V*

Example III was repeated except the absorbing solution contained no magnesium fluoborate. After heating a clear solution containing no precipitate was obtained. Analysis of the solution showed that more than 99% of the acetylide had been decomposed.

*Example VI*

Example III was repeated except that 0.1 ml. of the nitric acid was employed. Greater than 99% of the acetylide was decomposed and 98% of the decomposed acetylide was converted to carbon dioxide. The resulting solution contained no silver precipitate and no organic precipitate.

*Example VII*

Example VI was repeated except that methyl acetylene was used instead of acetylene. After heating the resulting solution was clear, colorless, and contained no precipitate. More than 95% of the acetylide was decomposed and more than 55% of the decomposed acetylide was converted to carbon oxides.

The present invention allows the separation of olefinic hydrocarbons from mixtures thereof with saturated hydrocarbons in the presence of acetylenes which form silver acetylides. Although the acetylenic impurity found in hydrocarbon streams is normally acetylene, the process of the present invention is also applicable to mono-substituted acetylenes such as methyl acetylene or butyne-1 which form silver acetylides. Disubstituted acetylenes such as butyne-2 do not form silver acetylides. The described improvement of the olefin separation process using the described silver salts dispenses with the costly and cumbersome hydrogenation step heretofore necessary to remove acetylenes from the hydrocarbon stream to be separated. In all other essential features the process described for the separation of hydrocarbons using a silver fluoborate or a silver fluosilicate solution is operated as described in the art.

I claim:

1. In the separation of olefinic hydrocarbons from fluid hydrocarbon mixtures containing such which also contain an acetylenic hydrocarbon of the general formula RC≡CH where R is from the class consisting of hydrogen and hydrocarbon radicals, comprising passing said fluid hydrocarbon mixture through an aqueous solution of silver salt selected from the class consisting of silver fluoborate, silver fluosilicate and mixtures thereof, and thereafter regenerating the silver salt solution and recovering the olefinic hydrocarbons, the step of removing silver acetylides of said acetylenes by reacting at least part of the regenerated solution at a temperature of at least 100° C. with nitric acid in the presence of a non-oxidizing mineral acid selected from the class consisting of hydrogen fluoride and fluoboric acid, the concentration of said mineral non-oxidizing acid being from 1 to 10 molar.

2. The process as set forth in claim 1 wherein the acetylenic hydrocarbon is acetylene.

3. The process as set forth in claim 1 wherein the acetylenic hydrocarbon is methyl acetylene.

4. The process as set forth in claim 1 wherein the silver salt solution comprises a silver fluoborate solution.

5. The process as set forth in claim 1 wherein the non-oxidizing mineral acid is fluoboric acid.

6. The process as set forth in claim 1 wherein the nitric acid is contacted at a temperature of 150 to 200° C. with the regenerated salt solution.

7. The process as set forth in claim 3 wherein the silver fluoborate solution is modified by the addition of a secondary metal fluoborate wherein the metal is a metal of group II of the periodic table of elements having atomic numbers from 4 to 56 inclusive.

8. The process as set forth in claim 7 wherein the secondary metal fluoborate is magnesium fluoborate.

References Cited in the file of this patent

UNITED STATES PATENTS 3,007,981     Baker et al. _____ Nov. 17, 1961

FOREIGN PATENTS 621,873     Great Britain _____ Apr. 21, 1959

UNITED STATES PATENT OFFICE
CERTIFICATE OF CORRECTION

Patent No. 3,101,381　　　　　　　　　　　　　　August 20, 1963

Warren Nesmith Baxter

It is hereby certified that error appears in the above numbered patent requiring correction and that the said Letters Patent should read as corrected below.

Column 3, line 43, for "2 M fluoborate, acid" read -- 2 M fluoboric acid --; column 4, line 16, for "megnesium" read -- magnesium --.

Signed and sealed this 25th day of February 1964.

(SEAL)
Attest:
ERNEST W. SWIDER

Attesting Officer

EDWIN L. REYNOLDS

Acting Commissioner of Patents